United States Patent [19]

Brown

[11] 4,138,606
[45] Feb. 6, 1979

[54] COOKING APPLIANCE

[75] Inventor: Richard N. Brown, Macungie, Pa.

[73] Assignee: General Electric Company, Bridgeport, Conn.

[21] Appl. No.: 828,896

[22] Filed: Aug. 29, 1977

[51] Int. Cl.² ............................................. F27D 11/00
[52] U.S. Cl. ..................................... 219/442; 219/438; 219/436; 220/408; 99/281
[58] Field of Search ............... 219/441, 442, 436, 438, 219/435, 439, 449; 99/281; 220/15, 9 R

[56] References Cited

U.S. PATENT DOCUMENTS

| | | | |
|---|---|---|---|
| 1,895,212 | 1/1933 | Smith | 219/436 |
| 1,924,699 | 8/1933 | Smith | 219/436 |
| 2,486,701 | 11/1949 | Berg | 220/15 X |
| 2,692,937 | 10/1954 | Clark | 219/436 |
| 2,725,460 | 11/1955 | Braski et al. | 219/436 |
| 2,923,803 | 2/1960 | Kueser | 219/441 |
| 3,725,641 | 4/1973 | Tilp | 219/433 |
| 4,024,377 | 5/1977 | Henke | 219/439 |

FOREIGN PATENT DOCUMENTS 517324  5/1921  France ............................... 219/438

Primary Examiner—J. V. Truhe
Assistant Examiner—M. Paschall
Attorney, Agent, or Firm—Leonard J. Platt; George R. Powers; John F. Cullen

[57] ABSTRACT

A cooking appliance wherein a unique U-shaped bracket is provided for connecting an outer housing, an inner cooking vessel, a thermostat assembly and a bottom cover to each other. One of the arms of the bracket is inserted through a downwardly extending tab of the cooking vessel, the other arm of the bracket is connected to a screw for mounting a stack thermostat, and the central portion of the bracket is connected to a screw for urging the vessel downwardly and the bottom cover upwardly to economically hold the parts in assembled position on the outer insulated housing.

3 Claims, 4 Drawing Figures

U.S. Patent Feb. 6, 1979 4,138,606
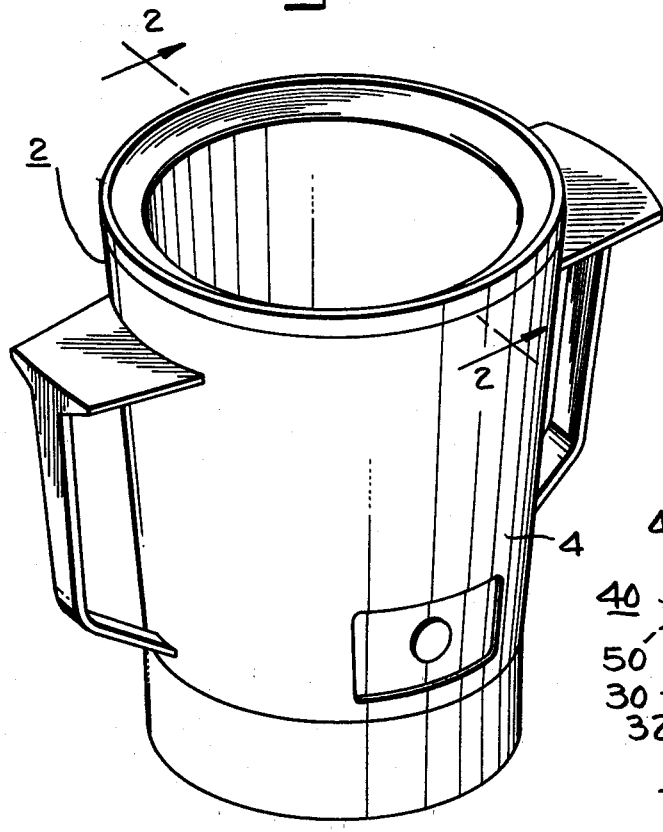
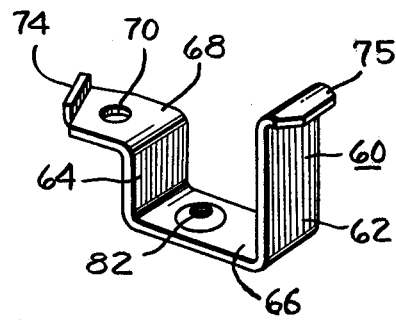
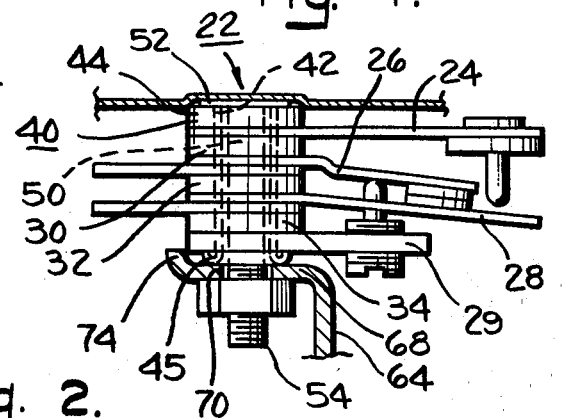
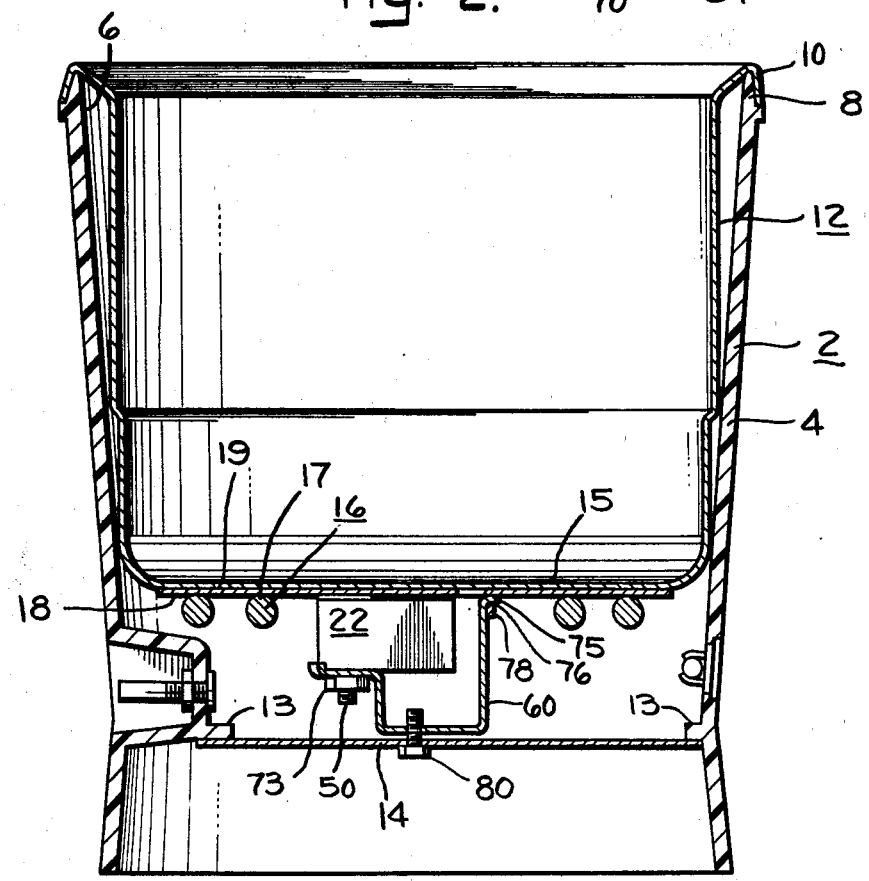

COOKING APPLIANCE

BACKGROUND OF THE INVENTION

1. Field of the Invention

This invention relates to a cooking appliance, and more particularly, to a unique bracket assembly for economically holding the parts of the cooking appliance to each other.

2. Description of the Prior Art

In electric cooking appliances it has been common practice to construct the appliance with a metal cooking vessel positioned within an outer insulating housing. Conventionally, sheathed electric heating elements and thermostat controls for the appliance are connected to the underside of the cooking vessel.

As shown in prior U.S. Pat. No. 3,725,641 to George E. Tilp, an insulating housing B includes a generally cylindrical side wall 3 and a bottom wall. A plurality of supporting legs 10 are provided on a metal plate which is brazed to the bottom of the cooking vessel. The legs 10 include angularly disposed feet 11 which are connected to the bottom wall of the insulated housing by means of bolts 12. The upper portion of the cooking vessel includes flange 1 providing a downwardly facing circular groove or channel 2 to receive the upper edge of the insulating housing B.

In a prior application of Fred E. Baker, Ser. No. 698,962, filed June 23, 1976, and assigned to the same assignee as the present invention, there is disclosed a glass or ceramic cooking vessel of the type commonly employed in slow cookers. A bail 28 preferably made of spring steel is provided for biasing a lower annular surface 36 of an inner ceramic or glass cooking vessel downwardly into sealing contact with the upper edge of the housing so as to prevent foodstuffs, water and the like from entering the space between the outer housing and the inner glass or ceramic cooking vessel.

This invention is concerned with such cooking appliances, and more particularly, to an arrangement in which a unique bracket is connected to a thermostat assembly and the bottom of a cooking vessel for urging an upper lip or flange portion of an inner cooking vessel downwardly into contact with an upper rim of an insulated housing for securely connecting the parts of the appliance to each other.

Accordingly, it is a particular object of my invention to provide an improved cooking appliance in which the parts are securely and reliably held to each other so as to prevent foodstuffs, water and the like from entering the space between an inner cooking vessel and an outer insulated housing.

It is another object of my invention to provide an improved cooking appliance which may be readily formed and constructed of relatively few parts which may be easily manufactured and readily connected to each other.

SUMMARY OF THE INVENTION

In accordance with one of the aspects of this invention a cooking appliance includes a housing having an outside wall, an inside wall and an upper rim portion surrounding an enlarged upper opening. A food vessel for deep fat frying or the like is inserted within the enlarged opening in the housing. The food vessel includes an upper outwardly extending flange or lip for engaging the upper rim of the housing, a downwardly extending side wall and a bottom portion having downwardly extending connecting screw. A lower plate is positioned below the cooking vessel and extends across the lower portion of the housing. A generally U-shaped bracket having two upwardly extending arms and a lower arm is provided for biasing the inner cooking vessel downwardly into sealing contact with the upper rim portion of the housing. One of the arms of the U-shaped bracket is shaped to provide a connection with the downwardly extending screw while the other arm of the U-shaped bracket is provided with a tab for connection with another portion of the bottom of the vessel. A screw extends through the lower transverse plate and the lower arm of the bracket for urging the bracket and the cooking vessel downwardly to thereby urge the upper flange of the cooking vessel into sealing contact with the rim of the housing.

With this construction, parts for a deep fat fryer or similar electric cooking appliance may be readily connected to each other during an assembly operation. A housing and a cooking vessel are simply turned upside down in assembled position. A thermostat assembly is readily positioned on the connecting screw that extends downwardly from the vessel with the screw extending through a hollow thermostat rivet. The U-shaped bracket is positioned so that the thermostat connecting screw extends through an aperture in one arm of the bracket and a tab on the bracket extends through an aperture in a carrier plate for the electric heating element of the appliance. A lower cover is positioned over the parts and a screw is connected through the lower cover and an aperture in the lower arm of the U-shaped bracket for connecting all of the parts to each other.

Accordingly, with my improved construction arrangement relatively few parts are required for assembling an inner cooking vessel to an outer housing and the connecting devices perform a plurality of functions. For example, a nut which would normally be required to hold a thermostat assembly to the appliance is also utilized for holding the unique U-shaped bracket to the inner cooking vessel. Moreover, a single screw not only holds a lower cover on the outer housing but is also utilized for pulling the unique U-shaped bracket downwardly to urge the upper lip of the cooking vessel into good contact with the upper rim of the insulated housing. Accordingly, a securely connected electric cooking vessel which may be readily manufactured with relatively few connecting elements has been achieved.

BRIEF DESCRIPTION OF THE DRAWING

Other objects and attendant advantages of the invention will be apparent from the following description taken in connection with the accompanying drawing in which:

FIG. 1 is a front perspective view of an electric pot for deep frying constructed in accordance with my invention;

FIG. 2 is a cross-sectional view of the fry pot electric cooking appliance taken substantially on the plane of 2—2 of FIG. 1;

FIG. 3 is a perspective view of my unique U-shaped bracket for readily connecting the parts of the fry pot cooking appliance to each other; and FIG. 4 is a fragmentary cross-sectional view of a lower portion of the electric pot showing details of the thermostat assembly.

DESCRIPTION OF THE PREFERRED EMBODIMENT

Referring now to the drawing and first particularly to FIGS. 1 and 2 there is shown an electric cooking appliance for deep frying which is constructed in accordance with my invention. As shown the appliance includes an outer insulating housing 2 which may be formed of plastic or other suitable insulating material. The housing is generally cylindrical in shape and includes a generally cylindrical outside wall 4 and a generally cylindrical inside wall 6. The housing also includes an upper rim portion 8 for receiving an outwardly extending flange 10 of an inner cooking vessel 12. An annular ring 13 may be integrally molded with the inner wall 6 of the housing 2 for receiving a bottom cover or lower plate 14.

The cooking vessel 12 is preferably formed of stainless steel so that it may be easily cleaned and a bottom portion 15 of the cooking vessel 12 includes a heating element assembly 16. As shown more particularly in FIG. 2 a heating element 17 may be brazed to a carrier plate 18 and simultaneously the carrier plate 18 may be brazed to the underside of the bottom wall 19 of the stainless steel vessel 12.

I provide a thermostat assembly 22 for controlling the temperature within the cooking vessel. The details of the thermostat do not form a part of my invention; however, it is believed that a general description of the elements is appropriate in order to illustrate my improved arrangement for connecting the thermostat assembly to the other components of the electric food cooker. As shown in FIGS. 2 and 4 the thermostat assembly 22 comprises a plurality of spaced blades 24, 26, 28 and 29 separated by insulating discs 30, 32 and 34. A tubular rivet 40 having a centrally located bore 42 and an end flange 44 is provided for assembling the insulating discs and blades. As shown in FIG. 2, the body portion of tubular rivet 40 may extend downwardly through the discs and blades and may be riveted over at the lower side of blade 29. Thus, the various parts of the thermostat assembly are firmly secured in a desired stacked relationship between the flange portion 44 of the rivet 40 and an opposite end portion 45 of the rivet.

A screw 50 having a head portion 52 and a threaded portion 54 is brazed to the bottom of the cooking vessel for receiving the bore 42 of the thermostat assembly.

In accordance with my invention, a unique U-shaped bracket 60 is interposed between the thermostat assembly 22, the bottom portion 15 of the cooking vessel, and the lower bottom plate 14 of the cooking appliance for securely holding the parts of the cooking appliance to each other. As shown more particularly in FIG. 3, the U-shaped bracket includes two upwardly extending arms 62 and 64 and a generally horizontal lower arm 66. One of the upper arms 64 includes a generally horizontal portion 68 which is provided with an aperture 70 for receiving the thermostat mounting screw 50. An upwardly extending tab 74 may be provided to engage the end portion of blade 29 of the thermostat assembly 22 to prevent the thermostat assembly from rotating. The other upstanding arm 62 of the U-shaped bracket is formed to include a generally horizontal tab portion 75 for reception by a slot 76 that may be readily provided in a downwardly extending tab 78 of the electric heater carrier plate 18.

With my unique construction, the fry pot cooking appliance may be readily assembled. The stainless steel cooking vessel 12 is turned upside down with its sheathed electric heater 16 and thermostat connecting screw 50 extending upwardly. Then, the thermostat assembly 22 is dropped on to the connecting screw 50 with the screw 50 extending through the bore 42 of rivet 40. Then my unique bracket 60 is positioned over the thermostat assembly 22 with tab 75 extending into slot 76, the aperture 70 positioned over screw 50 and a nut 73 may be attached to screw threads 54. Then the insulated housing 2 is positioned over the cooking vessel 12 with the rim 8 engaging the extending flange 10 of the cooking vessel 12. Then the bottom cover 14 is dropped into the lower portion of the insulated housing until it abuts the annular ring or flange 13 that is integrally formed with the housing. A screw 80 is then simply inserted through an aperture in the bottom cover 14 and an aperture 82 in the bracket in order to complete the assembly. In can be appreciated that as the screw 80 is tightened the bracket 60 and the cooking vessel 12 will be pulled downwardly in order to urge the upper flange 10 of the cooking vessel into good contact with the upper rim 8 of the insulated housing. Naturally, during this movement the screw 80 will also cause the bottom cover 14 to be biased upwardly against the annular ring 13 to securely hold the parts in assembled position.

With this unique construction it can be appreciated that most of the connecting parts perform dual functions. For example, the screw 50 which is required for holding the thermostat assembly 22 also functions to hold my unique bracket 60. Moreover, the screw 80 which might normally be required to simply hold the bottom cover on the appliance is also provided for biasing the entire cooking vessel 12 downwardly to provide a good fit between the outer flange 10 of the cooking vessel and the upper rim 8 of the insulated housing. Thus, an exceedingly simple and reliable connecting arrangement having relatively few parts has been achieved.

What I claim is:

1. A cooking appliance comprising:
   (a) a housing having outside walls means, inside wall means, an upper rim surrounding an enlarged upper opening, and a lower opening;
   (b) a cooking vessel for insertion within said housing, said vessel including side wall means, bottom wall means, and upper outwardly extending flange means positioned over the rim of said housing;
   (c) a downwardly extending screw fixed to the bottom wall means of said vessel, and a downwardly extending tab having a slot provided therein, said downwardly extending tab fixed to the bottom wall means of said vessel at a point spaced from said downwardly extending screw;
   (d) a lower transverse plate extending across the inside wall means of said housing;
   (e) a generally U-shaped bracket having two upwardly extending arms and a lower arm extending between said upwardly extending arms, one of the upwardly extending arms being shaped to provide means for connection with the downwardly extending screw and the other upwardly extending arm being shaped to provide a tab for connection with a bottom portion of the vessel at a point spaced from said screw by inserting the tab at the upper portion of said upwardly extending arm within the slot in the downwardly extending tap of the cooking vessel; and (f) screw connecting means extending through the lower plate and the lower arm of said U-shaped bracket for connecting the U-shaped bracket to the lower plate and for urging the vessel downwardly to hold the upper flange of the vessel in close contact with the upper rim of the housing.

2. A cooking appliance comprising:
(a) a housing having outside wall means, inside wall means, an upper rim surrounding an enlarged upper opening, and a lower opening;
(b) a cooking vessel for insertion within said housing, said cooking vessel including side wall means, bottom means and upper outwardly extending flange means positioned over the rim of said housing;
(c) a thermostat assembly having a bore extending through the assembly;
(d) a downwardly extending screw fixed to the bottom of said cooking vessel and the thermostat assembly being positioned with the screw extending through the bore of the assembly for mounting the assembly on the cooking vessel;
(e) a lower plate extending across the inside wall of the housing;
(f) a generally U-shaped bracket having two upwardly extending arms and a lower arm extending between said upwardly extending arms, one of the upwardly extending arms being shaped to provide an aperture for receiving the downwardly extending screw and the other upwardly extending arm being shaped provide a tab for engagement with the bottom of the cooking vessel at a point spaced from said screw; and (g) screw connecting means extending through the lower plate and the lower arm of said U-shaped bracket for connecting the U-shaped bracket to the lower plate and for urging the cooking vessel downwardly to hold the upper flange of the cooking vessel in close contact with the upper rim of the housing.

3. A cooking appliance as defined in claim 2 wherein the bottom means of the cooking vessel includes an electric heater assembly comprising a sheathed electric heating element connected to a metal plate and said heater assembly plate is formed to include a downwardly extending tab having a slot provided therein; so that said generally U-shaped bracket may be readily connected to the bottom of the cooking vessel by simply inserting the tab at the upper portion of said other of the upwardly extending arms within the slot in the tab of the heater assembly plate and placing the downwardly extending screw through the aperture that is formed in said one of the upwardly extending arms.

* * * * *